(12) United States Patent
Jin et al.

(10) Patent No.: US 11,560,991 B2
(45) Date of Patent: Jan. 24, 2023

(54) PORTABLE SOLAR STRIP LIGHTS

(71) Applicant: Linhai Zhongtian Electronic Appliance Co., Ltd, Zhejiang (CN)

(72) Inventors: Shimin Jin, Zhejiang (CN); Qianchao Lu, Zhejiang (CN); Xinglong Tu, Zhejiang (CN)

(73) Assignee: Linhai Zhongtian Electronic Appliance Co., Ltd, Linhai (CN)

(*) Notice: Subject to any disclaimer, the term of this patent is extended or adjusted under 35 U.S.C. 154(b) by 0 days.

(21) Appl. No.: 17/166,192

(22) Filed: Feb. 3, 2021

(65) Prior Publication Data

US 2022/0057056 A1 Feb. 24, 2022

(51) Int. Cl.
| | |
|---|---|
| *F21S 9/03* | (2006.01) |
| *F21S 4/20* | (2016.01) |
| *F21V 23/00* | (2015.01) |
| *F21V 23/04* | (2006.01) |
| *F21V 23/06* | (2006.01) |

(52) U.S. Cl.
CPC .............. *F21S 9/032* (2013.01); *F21S 4/20* (2016.01); *F21V 23/008* (2013.01); *F21V 23/0485* (2013.01); *F21V 23/06* (2013.01)

(58) Field of Classification Search
CPC .... F21V 23/06; F21V 23/0485; F21V 23/008; F21S 9/032; F21S 4/20
See application file for complete search history.

(56) References Cited

U.S. PATENT DOCUMENTS

| | | | | | |
|---|---|---|---|---|---|
| 6,283,612 | B1* | 9/2001 | Hunter | ................. | F21V 15/015 |
| | | | | | 362/217.05 |
| 7,021,787 | B1* | 4/2006 | Kuelbs | .................... | A45B 3/04 |
| | | | | | 362/183 |
| 8,277,073 | B2* | 10/2012 | Wells | ..................... | A45C 15/06 |
| | | | | | 362/191 |
| 10,876,727 | B1* | 12/2020 | Xi | ......................... | E04H 17/14 |
| 2002/0159257 | A1* | 10/2002 | Grajcar | .............. | G09F 13/0404 |
| | | | | | 362/231 |
| 2004/0031510 | A1 | 2/2004 | Li | | |
| 2009/0147504 | A1* | 6/2009 | Teeters | ................... | H01R 31/02 |
| | | | | | 362/153 |
| 2011/0267812 | A1* | 11/2011 | Van De Ven | ............ | F21K 9/23 |
| | | | | | 362/235 |
| 2015/0016093 | A1* | 1/2015 | Wilson | ................ | F21V 33/0008 |
| | | | | | 362/103 |
| 2016/0032545 | A1* | 2/2016 | Lumsden | ................. | F21S 4/20 |
| | | | | | 404/6 |
| 2016/0341407 | A1* | 11/2016 | Manfred | ................. | F21L 14/00 |
| 2017/0167720 | A1* | 6/2017 | Mueller | ................. | A41D 13/01 |
| 2018/0202620 | A1* | 7/2018 | Soofer | .................... | F21S 9/035 |
| 2018/0259610 | A1* | 9/2018 | Gagliano | ................. | F21S 9/02 |

FOREIGN PATENT DOCUMENTS

| | | |
|---|---|---|
| CN | 202739028 U | 2/2013 |
| CN | 209196597 U | 8/2019 |

* cited by examiner

*Primary Examiner* — Anabel Ton (57) ABSTRACT

A portable solar strip light includes a solar module, a power supply, a strip light assembly and an electrical connector. The solar module is electrically connected to the power supply. The strip light assembly is electrically connected to the power supply via the electrical connector. The strip light assembly includes at least one strip light which is fixedly connected to an external object via a fastener. A mounting member is provided at a bottom of the power supply to mount the power supply on the external object.

7 Claims, 9 Drawing Sheets

PORTABLE SOLAR STRIP LIGHTS

CROSS-REFERENCE TO RELATED APPLICATIONS

This application claims the benefit of priority from Chinese Patent Application No. 202021783145.0, filed on Aug. 24, 2020. The content of the aforementioned application, including any intervening amendments thereto, is incorporated herein by reference in its entirety.

TECHNICAL FIELD

The present application relates to photoelectric technique, and more particularly to a portable solar strip light.

BACKGROUND

There are mainly two ways to install lights or lamps on products such as patio umbrellas, tents and the like. Some lights are built in such products by manufacturers and operate on electricity from solar power, mains power and hybrid energy, and in this case users cannot replace the built-in lights. However, some lights which can be chosen according to users' needs are additionally disposed on those products, and are commonly powered by a rechargeable battery or a non-rechargeable alkaline battery. However, these existing lights lack portability, have complicated installation process and are neither energy-saving nor environmentally friendly.

Therefore, it is urgent for those skilled in the art to provide a portable solar light that can be assembled by users on the patio umbrellas, the tents and the like.

SUMMARY

Given the above, an object of the present disclosure is to provide a portable solar strip light, which aims to solve the problems that the existing lights used on patio umbrellas and the like are hard to assemble and cannot be disassembled.

The technical solutions of the present disclosure are described as follows.

The present disclosure provides a portable solar strip light, comprising:
  a solar module;
  a power supply;
  a strip light assembly; and
  an electrical connector;
  wherein the solar module is electrically connected to the power supply; and the strip light assembly is electrically connected to the power supply via the electrical connector; and
  the strip light assembly comprises at least one strip light which is fixedly connected to an external object via a fastener; and a mounting member is provided at a bottom of the power supply to mount the power supply on the external object.

The above-mentioned technical solutions bring the following beneficial effects.

In the portable solar strip light of the present application, the power supply is charged by the solar module to power the strip light. The mounting member is provided at the bottom of the power supply, so that the power supply can be easily fixed on ribs of the patio umbrellas or support rods of tents without affecting their normal use. In addition, the strip light can be fixed via the fastener at any appropriate positions, in other words, the portable solar strip light can be easily assembled and disassembled, thereby solving the problems that the existing lights used on the patio umbrellas, the tents and the like are hard to assemble and cannot be disassembled.

In some embodiments, the solar module comprises a solar panel and a backplane on which the solar panel is arranged.

In some embodiments, the power supply comprises a control circuit board, a battery and a switch which are electrically connected to the control circuit board, respectively; and a first port and a second port are provided on the control circuit board.

In some embodiments, the power supply further comprises a casing in which the control circuit board, the battery and the switch are arranged;
  the electrical connector is electrically connected to the control circuit board via the first port; and the battery is charged by an external power supply via the second port; and
  a first socket and a second socket are provided on the casing; and the first socket fits with the first port, and the second port fits with the second socket.

In some embodiments, the portable solar strip light further comprising a connector arranged between the backplane and the casing to connect them;
  the connector is an all-directional tubular connector or a plug connector.

The above-mentioned technical solutions bring the following beneficial effects.

In the present application, when the solar module and the power supply are connected via the all-directional tubular connector, the solar module can be adjusted to face any directions, so as to receive as much solar energy as possible and converts it into electric power, thereby effectively improving the power conversion efficiency and the practicability.

In some embodiments, the electrical connector is a multi-port connection box or a multi-port line connector.

In some embodiments, the multi-port connection box is a detachable multi-port connection box; and a cylindrical hole is provided at a center of the detachable multi-port connection box; and
  the detachable multi-port connection box comprises a first box and a second box; a plug-in structure is provided on an end face of the first box and the second box, respectively; and at least one third port is provided on an outer side of the first box and/or the second box, respectively to connect the at least one strip light.

In some embodiments, the multi-port connection box is an integrated multi-port connection box;
  the integrated multi-port connection box comprises a cover and a box body; the control circuit board and the battery are arranged in the box body; the at least one third port is provided on the control circuit board to connect the at least one strip light; the switch is arranged on the control circuit board; the solar panel is electrically connected to the control circuit board via the first port; and the strip light assembly is electrically connected to the control circuit board via the third port; and
  at least one third socket is provided on an outer side of the integrated multi-port connection box, and the third socket fits with the third port.

In some embodiments, the multi-port line connector comprises a main wire and at least two branch wires; the at least two branch wires are electrically connected to the main wire and electrically connected to the power supply via the main wire.

In some embodiments, the switch is electrically connected to the electrical connector; and the switch is an on-off switch, a touch switch with a control circuit or a passive infrared sensor switch.

The above-mentioned technical solutions bring the following beneficial effects.

In the present disclosure, the strip light assembly can be fixed via the fastener on parasols and the like according to user needs. An end of the electrical connector is electrically connected to various strip light assemblies, and the other end of the electrical connector is electrically connected to the power supply and the switch.

The portable solar strip light of the present application is applicable for the patio umbrellas, the tents and the like. In practice, users can easily assembly and disassembly and conveniently replace the portable solar strip light of the present application, involving strong practicability and low cost.

BRIEF DESCRIPTION OF THE DRAWINGS

The present application will be further described below with reference to the accompanying drawings, so that the technical solutions in the present disclosure become clearer. Obviously, the accompanying drawings disclosed below are not intended to limit the present application. Any other drawings can be made by those skilled in the art without sparing any creative efforts.

In the drawings, 1, solar module; 11, solar panel; 12, backplane; 2, power supply; 21, battery; 22, control circuit board; 23, casing; 3, connector; 4, strip light assembly; 41, strip light; 5, mounting member; 6, electrical connector; 61, multi-port line connector; 62, detachable multi-port connection box; 621, first box; 622, second box; 623, plug-in structure; 624, third port; 63, integrated multi-port connection box; 64, cover; 65, box body; and 7, switch.

DETAILED DESCRIPTION OF EMBODIMENTS

The present application will be further clearly and completely described below with reference to the accompanying drawings and the embodiments. It should be understood that these embodiments are merely illustrative and are not intended to limit the present disclosure. Any modifications made by those skilled in the art based on the embodiments of the present application without sparing any creative efforts should fall within the scope of the present application.

Embodiment 1

Figure 1:
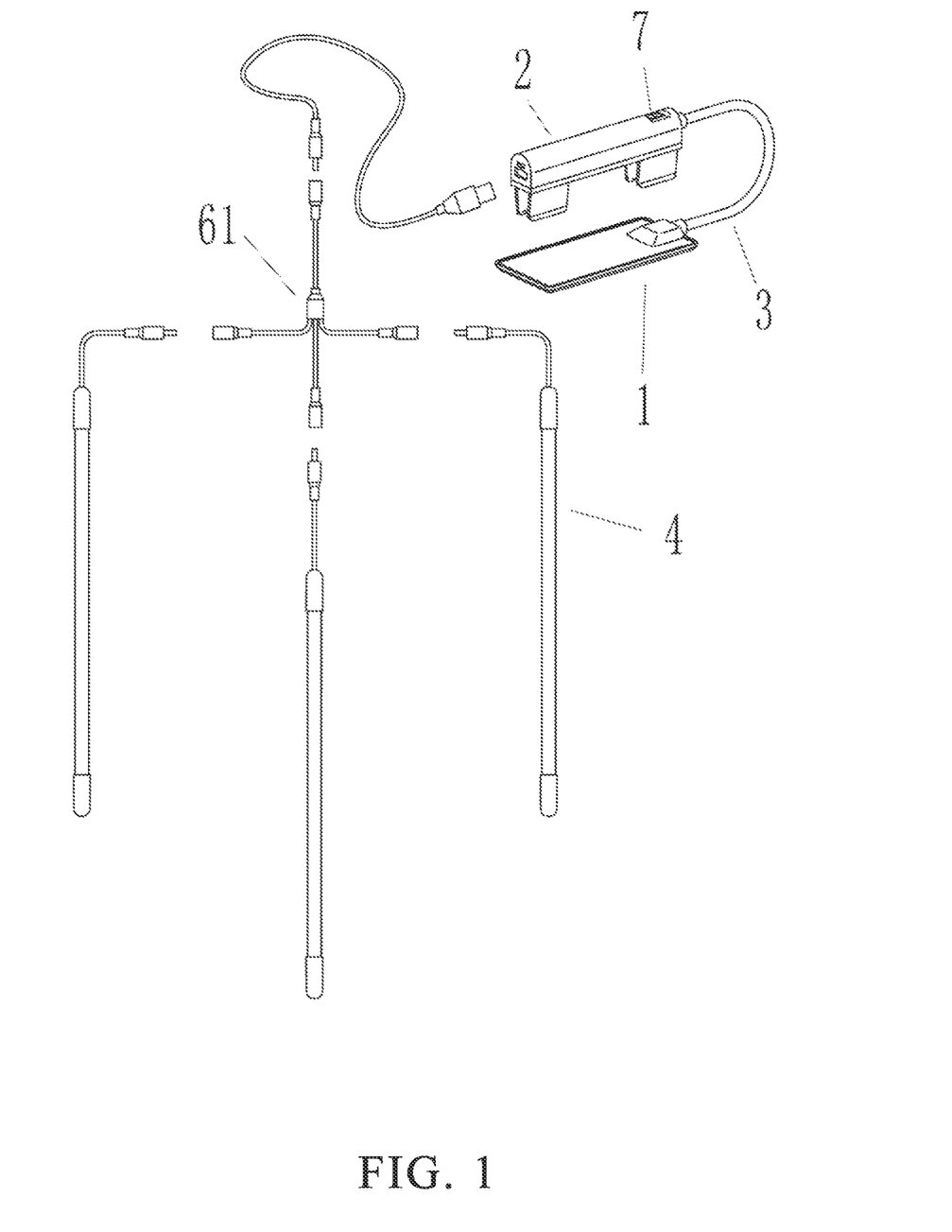
FIG. 1 is a schematic diagram of a portable solar strip light according to at least one embodiment of the present disclosure.

As shown in FIG. 1, a portable solar strip light includes a solar module 1, a power supply 2, a strip light assembly 4 and an electrical connector 6.

Figure 4:
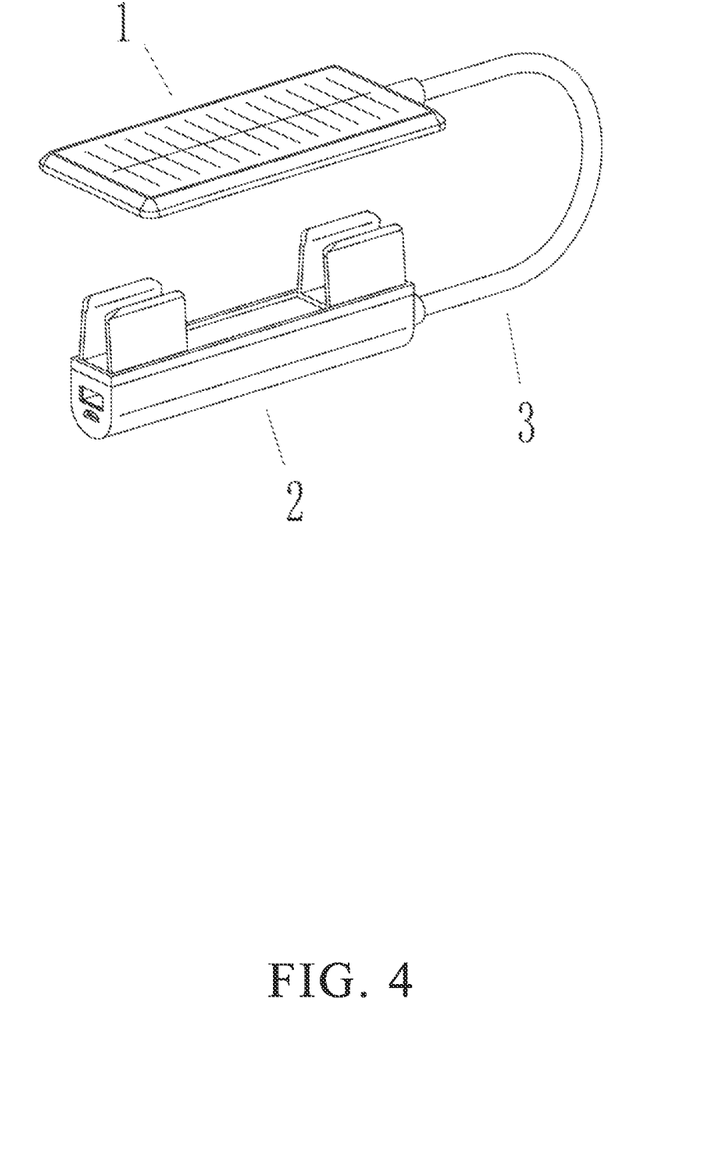
FIG. 4 is a schematic diagram of a solar module and a power supply in the portable solar strip light according to at least one embodiment of the present disclosure.

As shown in FIGS. 1 and 4, the solar module 1 is electrically connected to the power supply 2. The strip light assembly 4 is electrically connected to the power supply 2 via the electrical connector 6.

Figure 6:
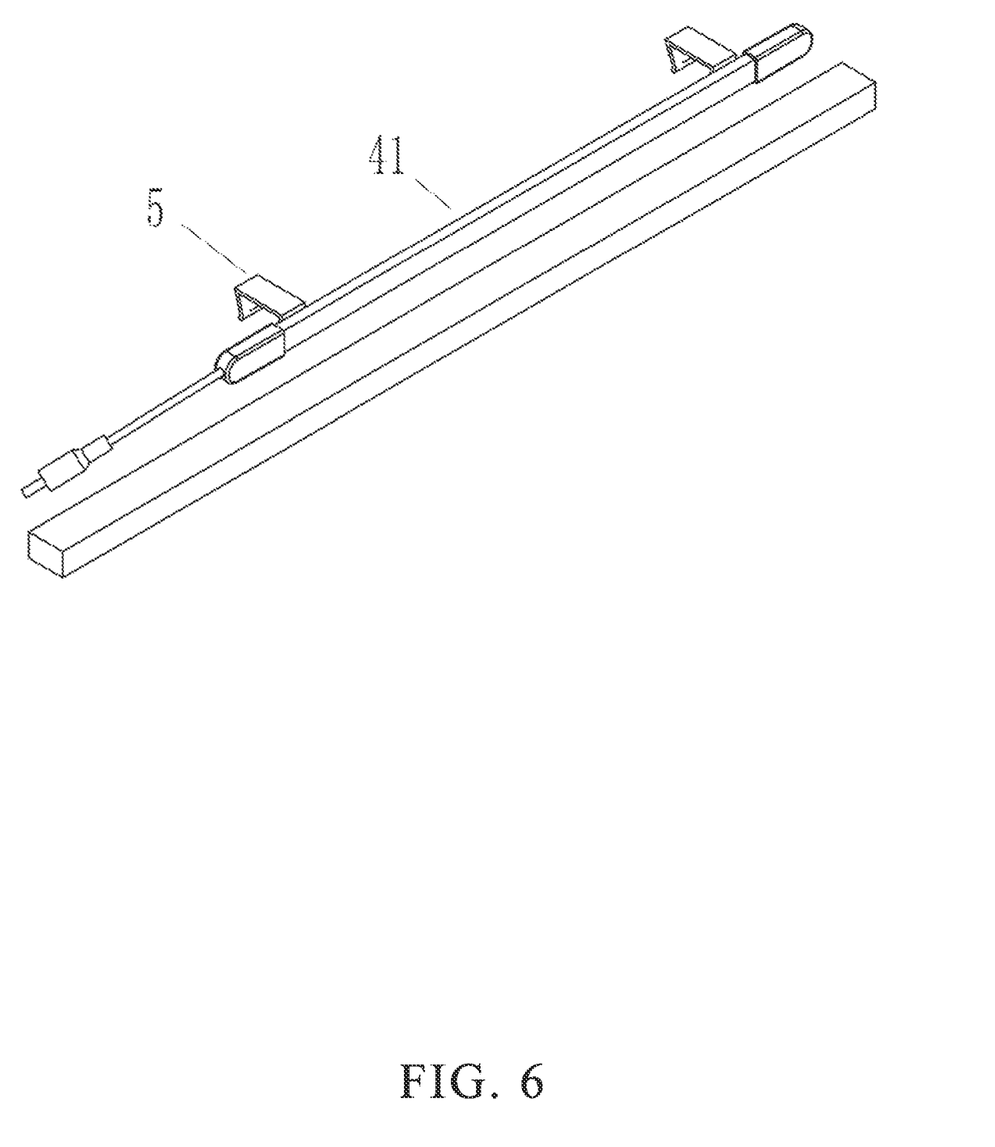
FIG. 6 is a schematic diagram of a strip light assembly in the portable solar strip light according to the present disclosure.

As shown in FIGS. 1 and 6, the strip light assembly 4 includes at least one strip light 41 which is fixedly connected to an external object via a fastener 5. A mounting member is provided at a bottom of the power supply 2 to mount the power supply on the external object.

Figure 5:
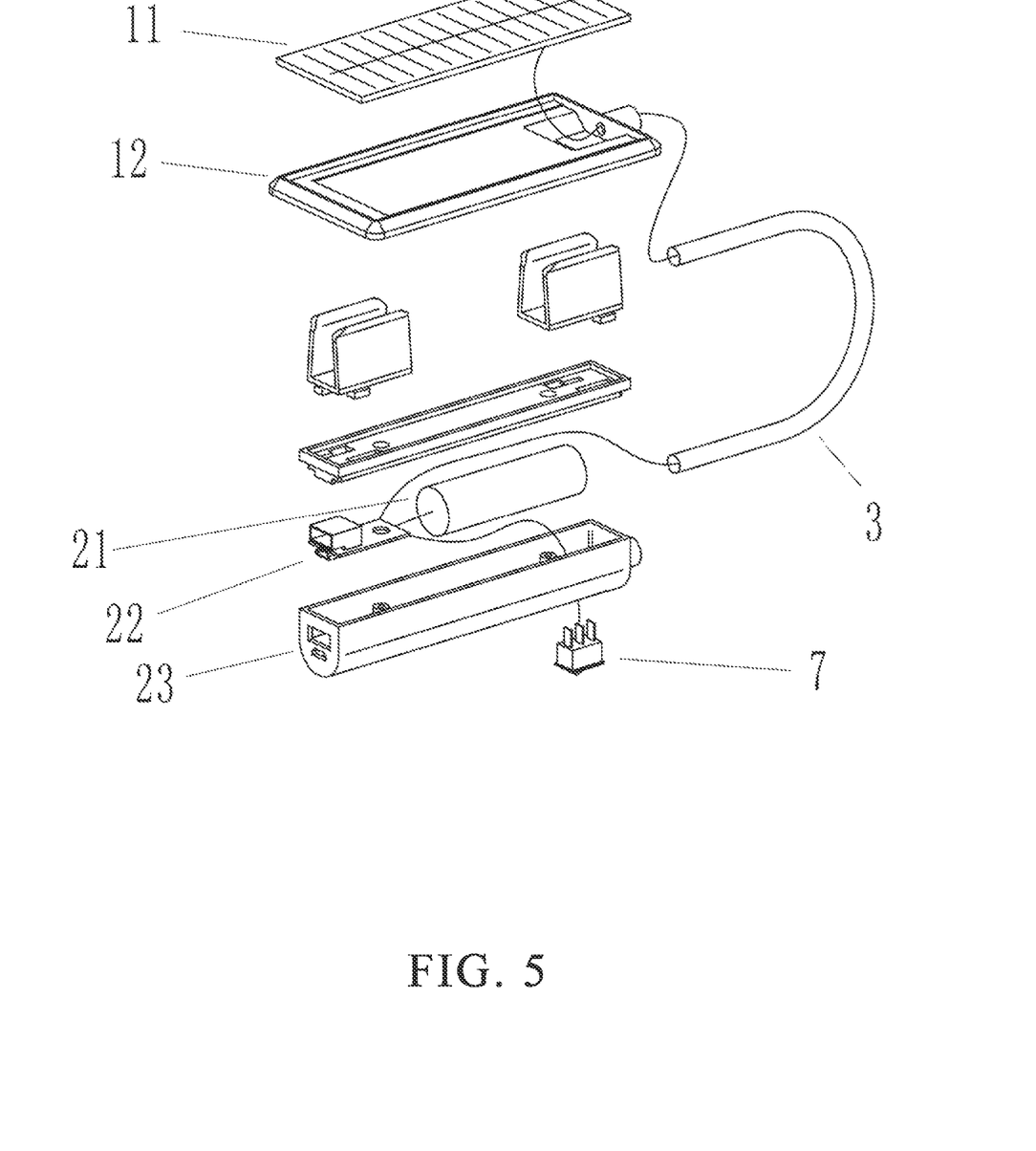
FIG. 5 is an exploded view of the solar module and the power supply in the portable solar strip light according to at least one embodiment of the present disclosure.

In some embodiments, as shown in FIG. 5, the solar module 1 includes a solar panel 11 and a backplane 12 on which the solar panel 11 is arranged.

In some embodiments, the power supply 2 includes a control circuit board 22, a battery 21 and a switch 7 which are electrically connected to the control circuit board 22, respectively. A first port and a second port are provided on the control circuit board.

In some embodiments, as shown in FIG. 5, the power supply 2 further includes a casing 23 in which the control circuit board 22, the battery 21 and the switch 7 are arranged.

The electrical connector 6 is electrically connected to the control circuit board 22 via the first port. The battery 21 is charged by an external power supply via the second port.

A first socket and a second socket are provided on the casing 23. The first socket fits with the first port, and the second port fits with the second socket.

In some embodiments, as shown in FIGS. 1 and 5, the portable solar strip light further includes a connector 3 arranged between the backplane 12 and the casing 23 to connect them. The solar module 1 is electrically connected to the power supply 2.

In some embodiments, the connector 3 is an all-directional tubular connector.

Figure 7:
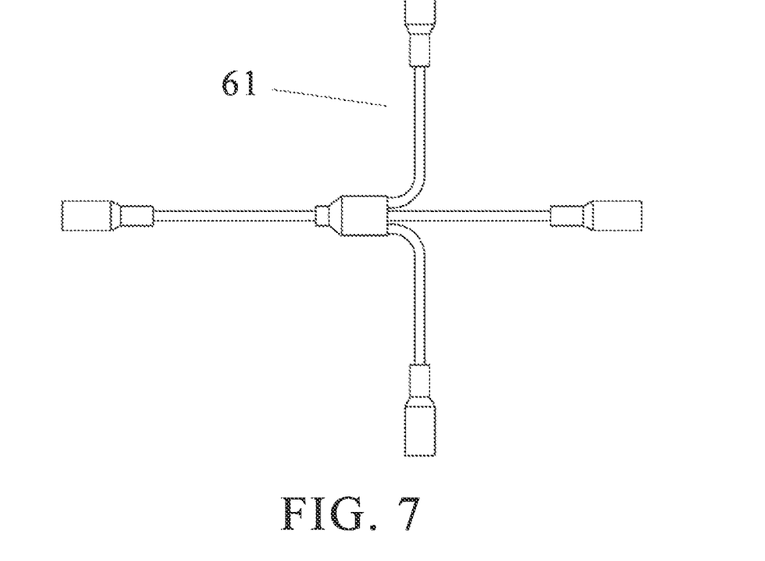
FIG. 7 is a schematic diagram of a multi-port line connector in the portable solar strip light according to the present disclosure.

In some embodiments, as shown in FIGS. 1 and 7, the electrical connector 6 is a multi-port line connector 61.

In some embodiments, as shown in FIG. 7, the multi-port line connector 61 includes a main wire and at least two branch wires. The at least two branch wires are electrically connected to the main wire and electrically connected to the power supply 2 via the main wire.

Embodiment 2

Figure 2:
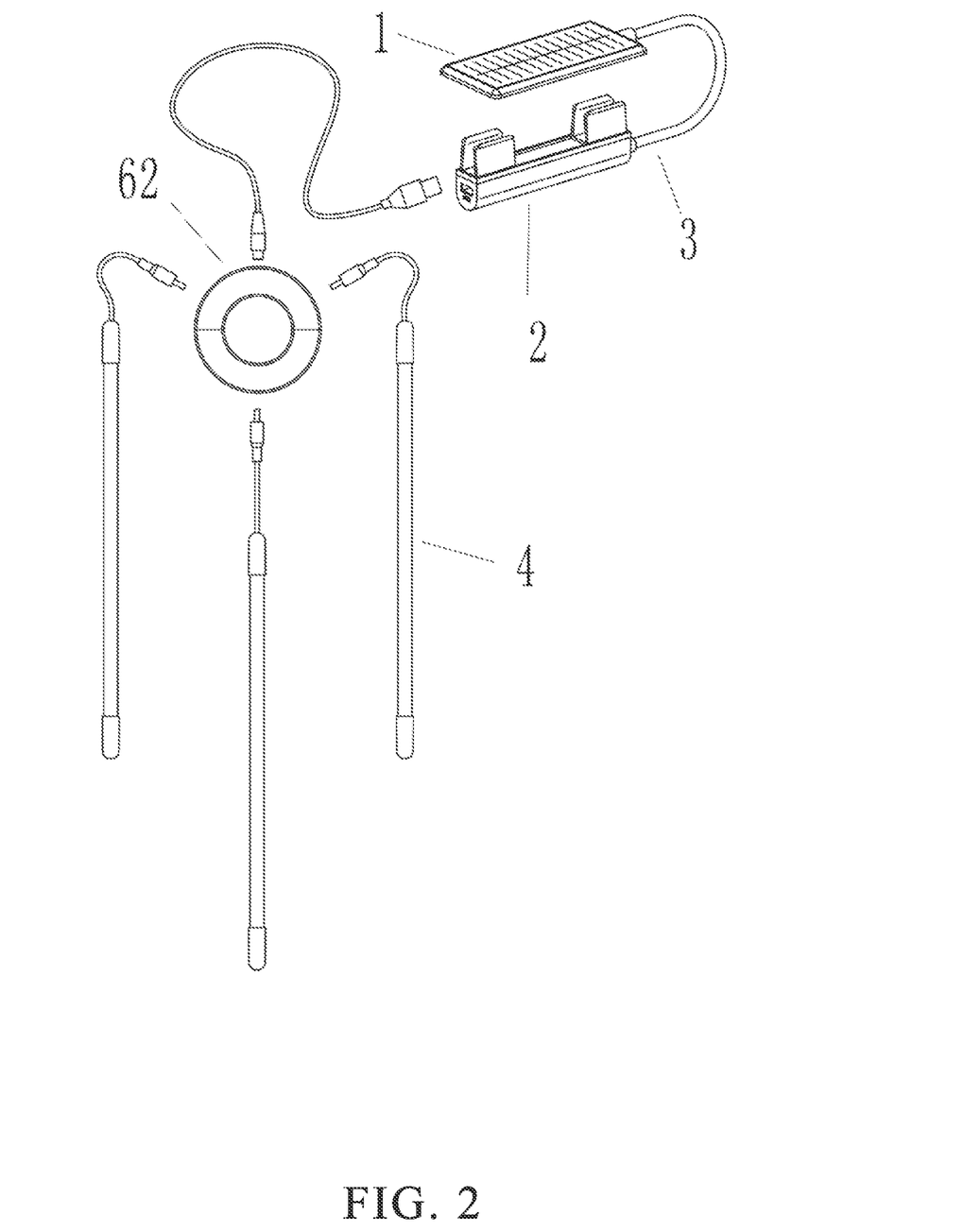
FIG. 2 is a schematic diagram of the portable solar strip light according to at least one embodiment of the present disclosure.

As shown in FIG. 2, a portable solar strip light includes a solar module 1, a power supply 2, a strip light assembly 4 and an electrical connector 6.

As shown in FIGS. 2 and 4, the solar module 1 is electrically connected to the power supply 2. The strip light assembly 4 is electrically connected to the power supply 2 via the electrical connector 6;

As shown in FIGS. 2 and 6, the strip light assembly 4 includes at least one strip light 41 which is fixedly connected to an external object via a fastener 5. A mounting member is provided at a bottom of the power supply 2 to mount the power supply 2 on the external object.

In some embodiments, as shown in FIG. 5, the solar module 1 includes a solar panel 11 and a backplane 12 on which the solar panel 11 is arranged.

In some embodiments, the power supply 2 includes a control circuit board 22, a battery 21 and a switch 7 which are electrically connected to the control circuit board 22, respectively. A first port and a second port are provided on the control circuit board.

In some embodiments, as shown in FIGS. 2 and 5, the power supply 2 also includes a casing 23 in which the control circuit board 22, the battery 21 and the switch 7 are arranged.

The electrical connector 6 is electrically connected to the control circuit board 22 via the first port. The battery 21 is charged by an external power supply via the second port.

A first socket and a second socket are provided on the casing 23. The first socket fits with the first port, and the second port fits with the second socket.

In some embodiments, as shown in FIGS. 2 and 5, the portable solar strip light further includes a connector 3 arranged between the backplane 12 and the casing 23 to connect them. The solar module 1 is electrically connected to the power supply 2.

In some embodiments, the connector 3 is an all-directional tubular connector.

Figure 8:
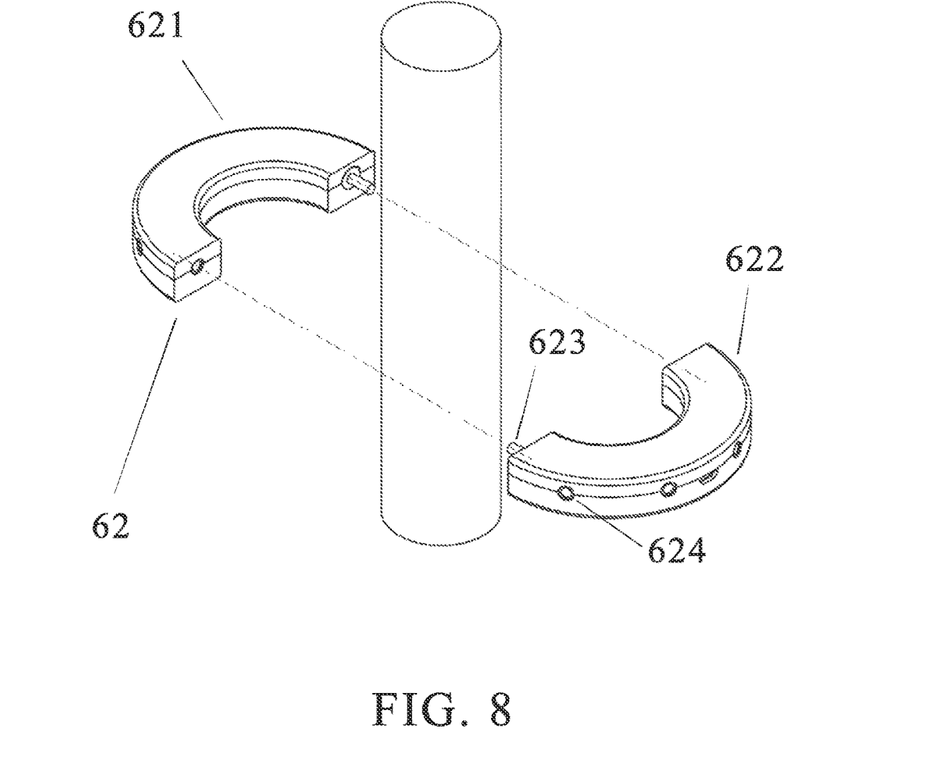
FIG. 8 is a schematic diagram of a detachable multi-port connection box in the portable solar strip light according to the present disclosure.

In some embodiments, as shown in FIG. 8, the electrical connector 6 is a detachable multi-port connection box. A cylindrical hole is provided at a center of the detachable multi-port connection box.

The detachable multi-port connection box 62 includes a first box 621 and a second box 622. A plug-in structure 623 is provided on an end face of the first box 621 and the second box 622, respectively, and at least one third port 624 is provided on an outer side of the first box 621 and/or the second box 622, respectively to connect the at least one strip light 41, respectively.

In some embodiments, the electrical connector 6 is a one connection box.

Embodiment 3

Figure 3:
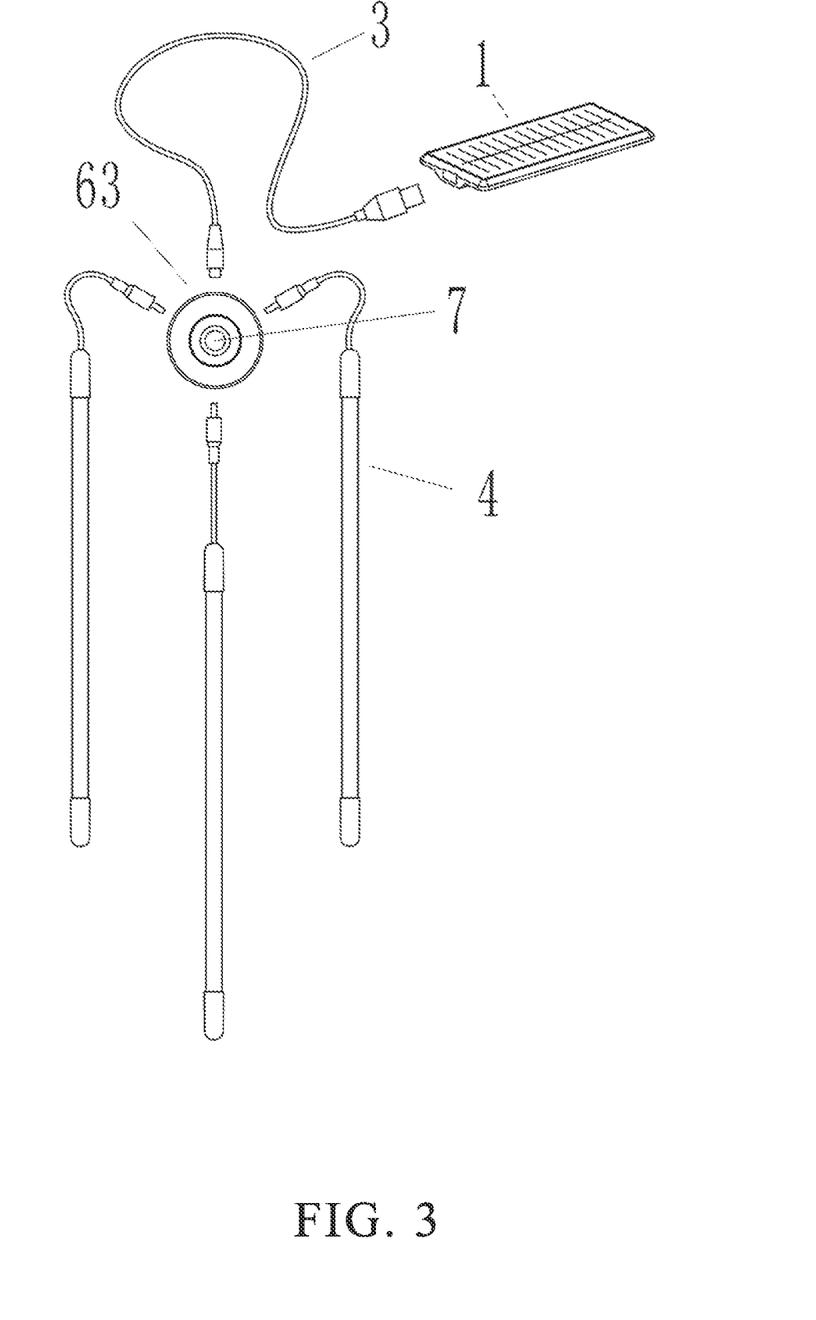
FIG. 3 is a schematic diagram of the portable solar strip light according to at least one embodiment of the present disclosure.

As shown in FIG. 3, a portable solar strip light includes a solar module 1, a power supply 2, a strip light assembly 4 and an electrical connector 6.

Figure 10:
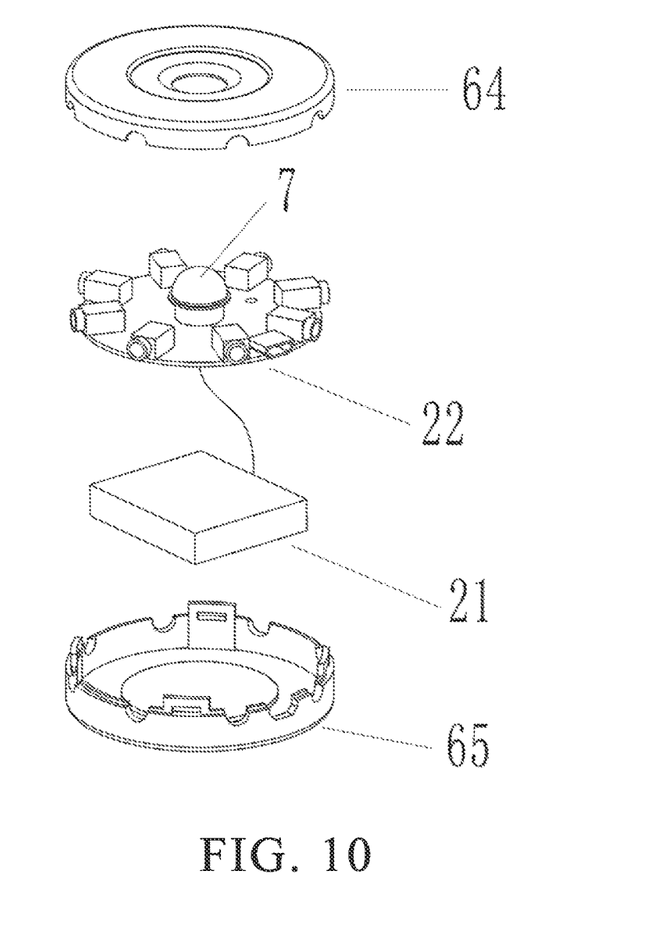
FIG. 10 is an exploded view of the integrated multi-port connection box in the portable solar strip light according to the present disclosure.

As shown in FIGS. 3 and 10, the solar module 1 is electrically connected to the power supply 2. The strip light assembly 4 is electrically connected to the power supply 2 via the electrical connector 6;

As shown in FIGS. 3 and 6, the strip light assembly 4 includes at least one strip light 41 which is fixedly connected to an external object via a fastener 5. A mounting member is provided at a bottom of the power supply 2 to mount the power supply on the external object.

In some embodiments, as shown in FIGS. 3 and 10, the solar module 1 includes a solar panel 11 and a backplane 12 on which the solar panel 11 is arranged.

In some embodiments, the power supply 2 includes a control circuit board 22, a battery 21 and a switch 7 which are electrically connected to the control circuit board 22, respectively. A first port and a second port are provided on the control circuit board.

In some embodiments, as shown in FIG. 3, the portable solar strip light further includes a connector 3 arranged between the backplane 12 and the casing 23 to connect them. The solar module 1 is electrically connected to the power supply 2.

In some embodiments, the connector 3 is an all-directional tubular connector.

In some embodiments, as shown in FIG. 3, the electrical connector 6 is an integrated multi-port connection box.

Figure 9:
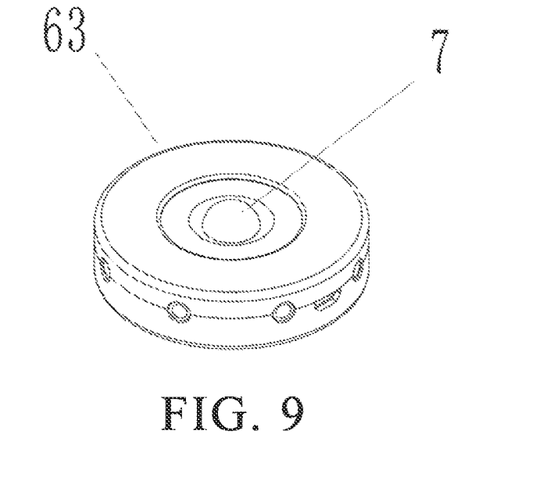
FIG. 9 is a schematic diagram of an integrated multi-port connection box in the portable solar strip light according to the present disclosure.

As shown in FIGS. 9 and 10, the integrated multi-port connection box 63 includes a cover 64 and a box body 65. The control circuit board 22 and the battery 21 are arranged in the box body 65. At least one third port is provided on the control circuit board to connect the at least one strip light 41. The switch 7 is arranged on the control circuit board 22. The solar panel 11 is electrically connected to the control circuit board 22 via the first port. The strip light assembly 4 is electrically connected to the control circuit board 22 via the third port.

At least one third socket is provided on an outer side of the integrated multi-port connection box 63, and the third socket fits with the third port.

It should be noted that in the embodiments mentioned above, the all-directional tubular connector can be replaced with a plug connector. The backplane 12 is connected to the casing 23 via the plug connector, so that the solar module 1 and the power supply 2 are electrically connected without the use of the all-directional tubular connector.

In addition, the electrical energy transmission between the solar module 1 and the power supply 2 can be with wires or without wires.

The switch 7 is electrically connected to the electrical connector 6. The switch 7 is an on-off switch, a touch switch with a control circuit or a passive infrared sensor switch. Moreover, the switch 7 can be arranged independently, or arranged on the power supply 2 or the electrical connector 6.

The working principle of the present application is described as follows.

Figure 11:
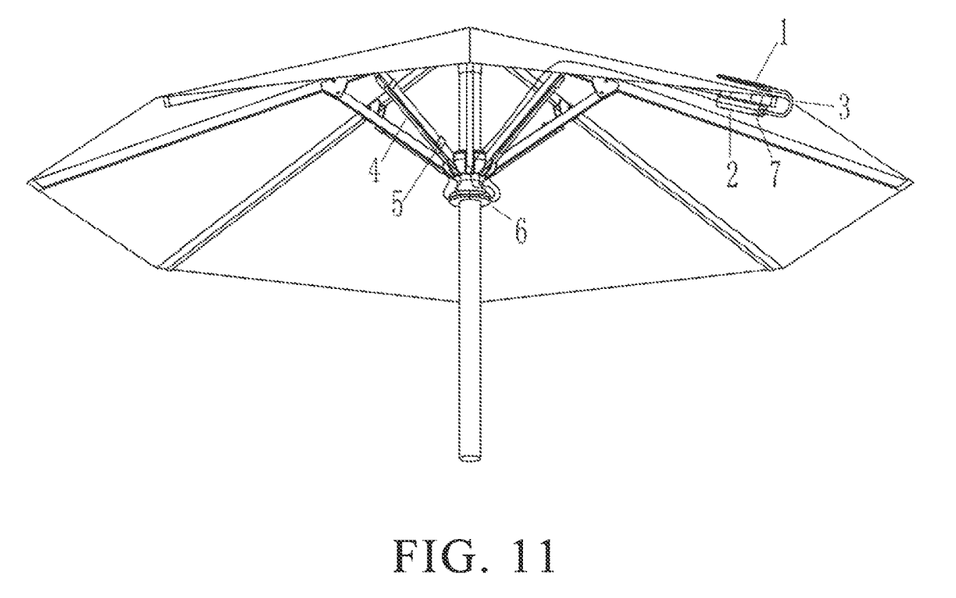
FIG. 11 is a schematic diagram of the portable solar strip light mounted on a parasol according to the present disclosure.
Figure 12:
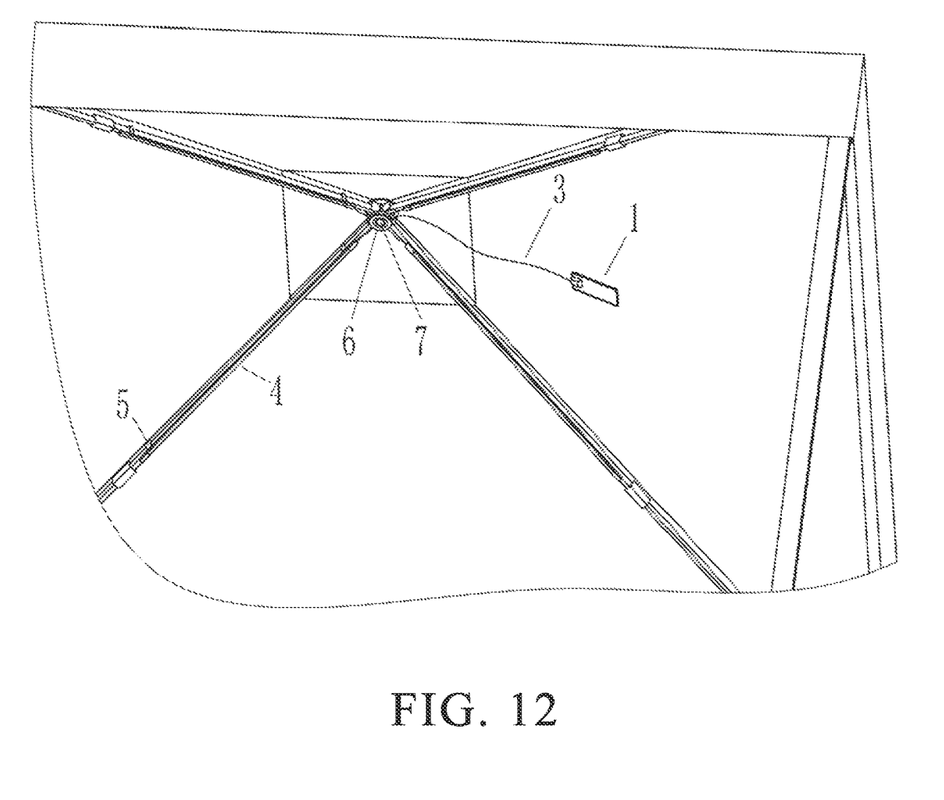
FIG. 12 is a schematic diagram of the portable solar strip light mounted on a tent according to the present disclosure.

During using the portable solar strip light of the present disclosure, the power supply 2 is fixedly connected to the rib of the patio umbrella or the support rod of the tent via a clamping piece, a double-sided tape, magnetic materials, a binding wire or the like. As shown in FIG. 11, the power supply 2 is fixed via the mounting member on the patio umbrella or the tent. By adjusting the all-directional tubular connector, the solar module 1 can absorb sunlight at an optimal angle. The strip light assembly 4 is fixed via the fastener 5 at any appropriate positions on the patio umbrella or the tent. The cylindrical hole is provided at the center of the multi-port connection box, so that the first box and the second box are engaged with the support rod of the patio umbrella or the tent in a snap fit. As shown in FIG. 12, the integrated multi-port connection box 63 can also be used in the present disclosure. The strip light assembly 4 is electrically connected to the power supply 2 via the integrated multi-port connection box 63 to realize lighting.

The solar panel 11 captures solar power and converts it into electric energy, and then the electric energy is stored in the power supply 2. The power supply 2 powers the strip light 41 via the multi-port line connector 61 or the multi-port connection box. The multi-port connection box is a detachable multi-port connection box 62 or an integrated multi-port connection box 63.

The power supply 2 can be easily disassembled from the portable solar strip light and is charged by an external battery via the second port, which ensures that the portable solar strip light can still be used in rainy days.

The embodiments disclosed above emphasize different features. Same or similar features in the embodiments can refer to each other. The device disclosed herein corresponds to the method disclosed herein, and thus is briefly described, so reference should be made to the disclosed method. The embodiments of the present application enable those skilled in the art to implement or use the present application. It is obvious that any modifications can be made by those skilled in the art. The principles defined in the present application can also be implemented in any other embodiments within the sprit and scope of the present application. The embodiments disclosed herein are not intended to limit the present application, but to provide widest scope that conforms the principles and features disclosed in the present application.

What is claimed is:

1. A portable solar strip light, comprising:
   a solar module;
   a power supply;
   a strip light assembly; and
   an electrical connector;
   wherein the solar module is electrically connected to the power supply; and the strip light assembly is electrically connected to the power supply via the electrical connector;
   the strip light assembly comprises at least one strip light which is fixedly connected to an external object via a fastener; and a mounting member is provided at a bottom of the power supply to mount the power supply on the external object;
   the solar module comprises a solar panel and a backplane on which the solar panel is arranged;
   the power supply comprises a control circuit board, a battery and a switch which are electrically connected to the control circuit board, respectively; and a first port and a second port are provided on the control circuit board;
   the power supply further comprises a casing in which the control circuit board, the battery and the switch are arranged;
   the electrical connector is electrically connected to the control circuit board via the first port; and the battery is charged by an external power supply via the second port; and
   a first socket and a second socket are provided on the casing; and the first socket fits with the first port, and the second port fits with the second socket.

2. The portable solar strip light of claim 1, further comprising a connector arranged between the backplane and the casing to connect them;
   wherein the connector is an all-directional tubular connector or a plug connector.

3. A portable solar strip light, comprising:
   a solar module;
   a power supply;
   a strip light assembly; and
   an electrical connector;
   wherein the solar module is electrically connected to the power supply; and the strip light assembly is electrically connected to the power supply via the electrical connector;
   the strip light assembly comprises at least one strip light which is fixedly connected to an external object via a fastener; and a mounting member is provided at a bottom of the power supply to mount the power supply on the external object;
   the solar module comprises a solar panel and a backplane on which the solar panel is arranged;
   the power supply comprises a control circuit board, a battery and a switch which are electrically connected to the control circuit board, respectively; and a first port and a second port are provided on the control circuit board;
   the electrical connector is a multi-port connection box or a multi-port line connector.

4. The portable solar strip light of claim 3, wherein the multi-port connection box is detachable multi-port connection box; and a cylindrical hole is provided at a center of the detachable multi-port connection box; and
   the detachable multi-port connection box comprises a first box and a second box; a plug-in structure is provided on an end face of the first box and the second box, respectively; and at least one third port is provided on an outer side of the first box and/or the second box, respectively to connect the at least one strip light.

5. The portable solar strip light of claim 3, wherein the multi-port connection box is an integrated multi-port connection box;
   the integrated multi-port connection box comprises a cover and a box body; the control circuit board and the battery are arranged in the box body; the at least one third port is provided on the control circuit board to connect the at least one strip light;
   the switch is arranged on the control circuit board; the solar panel is electrically connected to the control circuit board via the first port; and the strip light assembly is electrically connected to the control circuit board via the third port; and
   at least one third socket is provided on an outer side of the integrated multi-port connection box; and the third socket fits with the third port.

6. The portable solar strip light of claim 3, wherein the multi-port line connector comprises a main wire and at least two branch wires; the at least two branch wires are electrically connected to the main wire and electrically connected to the power supply via the main wire.

7. The portable solar strip light of claim 1, wherein the switch is electrically connected to the electrical connector; and the switch is an on-off switch, a touch switch with a control circuit or a passive infrared sensor switch.

* * * * *